United States Patent
Lukach

(10) Patent No.: US 10,860,719 B1
(45) Date of Patent: Dec. 8, 2020

(54) DETECTING AND PROTECTING AGAINST SECURITY VULNERABILITIES IN DYNAMIC LINKERS AND SCRIPTS

(71) Applicant: CyberArk Software Ltd., Petach-Tikva (IL)

(72) Inventor: Amir Lukach, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 16/811,124

(22) Filed: Mar. 6, 2020

(51) Int. Cl.
| | |
|---|---|
| *G06F 21/00* | (2013.01) |
| *G06F 21/56* | (2013.01) |
| *G06F 21/14* | (2013.01) |
| *G06F 21/54* | (2013.01) |

(52) U.S. Cl.
CPC .......... *G06F 21/566* (2013.01); *G06F 21/14* (2013.01); *G06F 21/54* (2013.01); *G06F 21/563* (2013.01); *G06F 21/565* (2013.01)

(58) Field of Classification Search
CPC ...... G06F 21/566; G06F 21/54; G06F 21/565; G06F 21/563; G06F 21/14
See application file for complete search history.

(56) References Cited

U.S. PATENT DOCUMENTS

| | | | | |
|---|---|---|---|---|
| 8,418,249 B1* | 4/2013 | Nucci | ................ | H04L 63/1416 |
| | | | | 726/23 |
| 10,581,888 B1* | 3/2020 | Agranonik | ............. | H04L 63/20 |
| 2013/0291111 A1* | 10/2013 | Zhou | ..................... | G06F 21/563 |
| | | | | 726/23 |

FOREIGN PATENT DOCUMENTS

KR         101874373 B1 *  7/2018

OTHER PUBLICATIONS

Translation of KR101874373B1 (Year: 2018).*

* cited by examiner

*Primary Examiner* — Kendall Dolly
(74) *Attorney, Agent, or Firm* — Finnegan, Henderson, Farabow, Garrett & Dunner LLP

(57) ABSTRACT

Disclosed embodiments relate to systems and methods for statistically analyzing and classifying dynamically linked libraries and computing scripts. Techniques include identifying a plurality of libraries, developing a statistical classification model, implementing the statistical classification model, classifying, based on the implementing, an operational phase library to be potentially malicious, and implementing a security control for the library. Further techniques include identifying a plurality of computing scripts, developing a statistical classification model, implementing the statistical classification model, classifying, based on the implementing, an operational computing script to be potentially malicious, and implementing, for the classified operational computing script, a security control action.

20 Claims, 6 Drawing Sheets

DETECTING AND PROTECTING AGAINST SECURITY VULNERABILITIES IN DYNAMIC LINKERS AND SCRIPTS

BACKGROUND

Cyber-attackers often search for ways to secretly compromise computer systems. One such way is by hijacking a dynamic linked library. Dynamic linked libraries are software modules containing functions and data that can be used by other applications. When an application calls a dynamic linked library, it executes a predefined search path to find the library. If an attacker knows the order of this predefined search path, the attacker can place a malicious dynamic linked library file of the same name as the real one higher on the search path. Thus, when the application searches for the real dynamic linked library using the predefined search path, it will encounter and load the malicious dynamic linked library first. By loading the malicious dynamic linked library, the application may make the system vulnerable to attack (e.g., credential theft, misuse or impersonation, privilege escalation, etc.).

Some schemes for detecting loading of unsafe dynamic linked libraries have been attempted, but these schemes are not applied to a real-time detection or load prevention mechanism. They are thus unsuitable for real world, dynamic computing environments. Accordingly, in view of these and other deficiencies in existing techniques, technological solutions are needed for real time detection and blocking of malicious dynamic linked libraries. Solutions should advantageously analyze a dynamic linked library without loading it, for example by examining certain features of the dynamic linked library. As discussed further below, solutions may implement statistical techniques to determine, based on the analysis, if a dynamic linked library is potentially malicious. Solutions may also implement security controls to prevent loading of dynamic linked libraries determined to be potentially malicious.

Malicious scripts also present risks to computing systems in similar ways. Malicious scripts with the same name as legitimate scripts may be executed by applications on a computing system. Such scripts when executed may carry out an attack on the system. Accordingly, technological solutions are also needed for real time detection and blocking of malicious scripts. Solutions should advantageously analyze a script without executing it. Solutions may implement statistical techniques to determine, based on the analysis, if a script is potentially malicious. Solutions may also implement security controls to prevent execution of scripts determined to be potentially malicious.

SUMMARY

The disclosed embodiments describe non-transitory computer readable media, systems, and methods for detecting and protecting against security vulnerabilities in dynamic linkers and scripts. For example, in an exemplary embodiment, there may be a non-transitory computer readable medium including instructions that, when executed by at least one processor, may cause the at least one processor to perform operations for statistically analyzing and classifying dynamically linked libraries. The operations may comprise identifying a plurality of libraries associated with a dynamic linker, the dynamic linker being associated with an operating system; developing a statistical classification model for the dynamic linker, the statistical classification model being developed through a training phase based on at least one of: a number of the plurality of libraries having a common name, a number of the plurality of libraries having a particular version, a number of the plurality of libraries having a particular size, a source of creation for one or more of the plurality of libraries, a digital signature status for one or more of the plurality of libraries, or a number of digital signature publishers associated with a digital signature status for one or more of the plurality of libraries; implementing the statistical classification model for the dynamic linker in an operational phase; classifying, based on the implementing, an operational phase library to be potentially malicious by the statistical classification model; and implementing, for the classified operational phase library, a security control action.

According to a disclosed embodiment, the security control action may include blocking access to the operational phase library.

According to a disclosed embodiment, the security control action may include auditing operation of the operational phase library.

According to a disclosed embodiment, the security control action may include sending a prompt to a security application identifying the classified operational phase library.

According to another disclosed embodiment, a method may be implemented for statistically analyzing and classifying dynamically linked libraries. The method may comprise identifying a plurality of libraries associated with a dynamic linker, the dynamic linker being associated with an operating system; developing a statistical classification model for the dynamic linker, the statistical classification model being developed through a training phase based on at least one of: a number of the plurality of libraries having a common name, a number of the plurality of libraries having a particular version, a number of the plurality of libraries having a particular size, a source of creation for one or more of the plurality of libraries, a digital signature status for one or more of the plurality of libraries, or a number of digital signature publishers associated with a digital signature status for one or more of the plurality of libraries; implementing the statistical classification model for the dynamic linker in an operational phase; classifying, based on the implementing, an operational phase library to be potentially malicious by the statistical classification model; and implementing, for the classified operational phase library, a security control action.

According to a disclosed embodiment, the operational phase library may be assigned a probability of being potentially malicious.

According to a disclosed embodiment, the operational phase library may be determined to be potentially malicious if the probability exceeds a threshold.

According to a disclosed embodiment, the operations may further comprise detecting, based on the implementing, a second operational phase library that is classified to be benign by the statistical classification model.

According to a disclosed embodiment, the operations may further comprise not implementing the security control action for the second operational phase library.

According to a disclosed embodiment, the statistical classification model may be a decision tree classifier model.

According to another disclosed embodiment, there may be a non-transitory computer readable medium including instructions that, when executed by at least one processor, may cause the at least one processor to perform operations for statistically analyzing and classifying computing scripts. The operations may comprise identifying a plurality of computing scripts; developing a statistical classification model for the plurality of computing scripts, the statistical classification model being developed through a training phase based on at least one of: an obfuscation status for the plurality of computing scripts, an entropy for the plurality of computing scripts, a size of the plurality of computing scripts, an encoding type for the plurality of computing scripts, a presence of keywords in the plurality of computing scripts, a presence of non-decimal numerals in the plurality of computing scripts; implementing the statistical classification model for the plurality of computing scripts in an operational phase; classifying, based on the implementing, an operational computing script to be potentially malicious by the statistical classification model; and implementing, for the classified operational computing script, a security control action.

According to a disclosed embodiment, the plurality of computing scripts may be associated with a common virtual computing platform.

According to a disclosed embodiment, the plurality of computing scripts may be associated with a particular computing resource.

According to a disclosed embodiment, the non-decimal numerals may include a hexadecimal numeral.

According to a disclosed embodiment, the obfuscation status may identify whether the plurality of scripts have been transformed from a first version to an obfuscated version.

According to another disclosed embodiment, a method may be implemented for statistically analyzing and classifying computing scripts. The method may comprise identifying a plurality of computing scripts; developing a statistical classification model for the plurality of computing scripts, the statistical classification model being developed through a training phase based on at least one of: an obfuscation status for the plurality of computing scripts, an entropy for the plurality of computing scripts, a size of the plurality of computing scripts, an encoding type for the plurality of computing scripts, a presence of keywords in the plurality of computing scripts, or a presence of non-decimal numerals in the plurality of computing scripts; implementing the statistical classification model for the plurality of computing scripts in an operational phase; classifying, based on the implementing, an operational computing script to be potentially malicious by the statistical classification model; and implementing, for the classified operational computing script, a security control action.

According to a disclosed embodiment, the method may further comprise detecting, based on the implementing, a second operational computing script that is classified to be benign by the statistical classification model.

According to a disclosed embodiment, the method may further comprise not implementing the security control action for the second operational computing script.

According to a disclosed embodiment, the security control action may include blocking access to the operational computing script.

According to a disclosed embodiment, the security control action may include auditing operation of the operational computing script.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
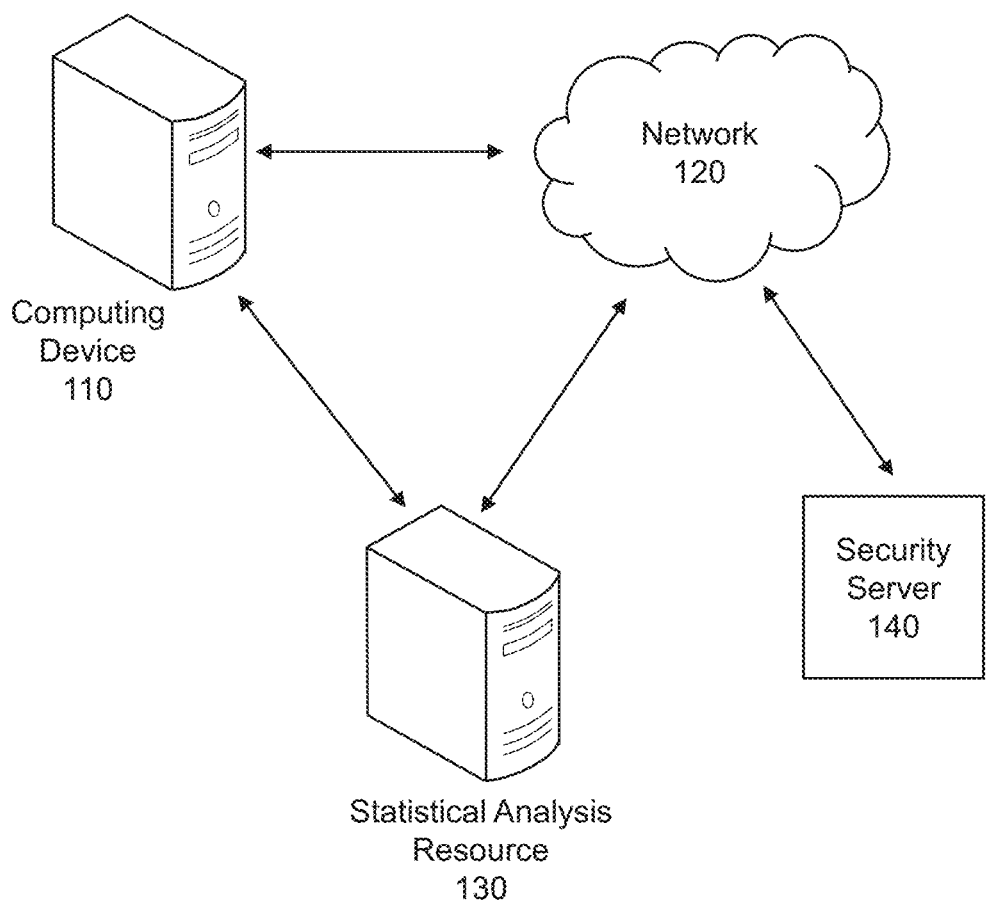
FIG. 1 is a block diagram of an exemplary system for statistically analyzing and classifying dynamic linked libraries or computing scripts in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of statistically analyzing and classifying dynamic linked libraries ("libraries" or "DLLs") and computing scripts described herein overcome several technological problems relating to the security of computing devices. As described below, the disclosed embodiments provide techniques for a computing device to analyze and classify libraries and scripts in order to determine if a library or script is malicious or "hijacked." The analysis may occur by identifying several characteristics of a library that may be analyzed without actually needing to load the library. A statistical classification model may then be used to classify the library as malicious or non-malicious, based on the characteristics. In some embodiments, the classification model may be a machine learning model that is trained to classify libraries. Disclosed embodiments may permit analysis and classification of a library without loading the library, thus permitting real-time detection of potentially malicious libraries without exposing the system to an attack from a malicious library. If a library is identified as malicious, disclosed embodiments may implement various security controls to address the malicious library and prevent an attack. Similar techniques, as described below, are disclosed for analyzing and classifying computing scripts.

Libraries may be software modules containing functions and data that can be used by applications. Libraries are often used by computer operating systems to provide multiple applications with data or functions. Libraries can permit applications to be modularized to facilitate efficiency, reduce memory use, and streamline updating of applications. To load a library, an application may execute a predefined search path. The application may check each location within the search path for the desired library until it finds the library or exhausts the locations within the search path. An exemplary search path for a Windows™ application may first check the current working directory of the application, then \windows, then the \windows\system32 directory, then the \windows\syswow64 xdirectory, etc. Attackers may "hijack" a DLL by placing a malicious library higher within a search path than the location of legitimate library. Such an attack may also be referred to as DLL preloading attack, binary planting attack, or DLL spoofing. In the example above, an attacker may place a malicious library in the \windows directory, but the legitimate library may be in the \windows\syswow64 directory. In that exemplary situation, an application attempting to load the legitimate library may actually load the malicious library because the malicious library may be encountered first in the search path.

Malicious scripts present similar risks to computing systems. Malicious scripts with the same name as legitimate scripts may be executed by applications on a computing system. If a malicious script is executed, it may carry out or facilitate an attack on the system.

Disclosed embodiments provide techniques for a computing device to analyze and classify libraries and scripts in order to determine if a library or script is malicious or "hijacked." The analysis and classification may occur in real-time, without loading or execution of the malicious DLL or script. In some embodiments, once a malicious DLL or script is identified, security controls may be implemented to prevent loading of the malicious DLL or script, or remove it from the system.

Reference will now be made in detail to the disclosed embodiments, examples of which are illustrated in the accompanying drawings.

FIG. 1 is a block diagram of an exemplary system for statistically analyzing and classifying dynamic linked libraries or computing scripts in accordance with disclosed embodiments. System 100 may include a computing device 110, a network 120, a statistical analysis resource 130, and a security server 140, as shown in FIG. 1 and discussed further below.

Computing device 110 may include a variety of different computing devices, including those capable of communicating over a network and those configured for short-range device-to-device communications. For example, computing device 110 may be a personal computer (e.g., a desktop or laptop), an IoT device (e.g., sensor, smart home appliance, printer, connected vehicle, industrial device, etc.), a server, a mainframe, a virtual machine (e.g., virtualized computer, container instance, etc.), or similar. Computing device 110 may also be a handheld device (e.g., a mobile phone, a tablet, notebook, digital camera, etc.), a wearable device (e.g., a smart watch, smart jewelry, an implantable device, a fitness tracker, smart clothing, a head-mounted display, etc.), or various other devices capable of processing and/or receiving data.

In certain embodiments, computing device 110 may be a terminal-based (e.g., Unix or Linux) computing device. For example, the computing device 110 may provide only a terminal interface for interacting with the system. In some embodiments, by contrast, computing device 110 may operate using a visual operating system, such as a Windows™ operating system, Apple™ operating system, Android™ operating system, a cloud-based operating system (e.g., through AWS™, Azure™, IBM Cloud™, etc.), or other types of non-terminal operating systems. In some embodiments, computing device 110 may include or be in communication with various computing resources, storage resources, security services, developer tools, analytics tools, etc. implemented on the cloud using a virtualization tool provided by, for example, Amazon Web Services™ (AWS™), Microsoft Azure™, IBM Cloud™, Google Cloud Platform™, Cisco Metapod™, Joyent™, vmWare™, or others. As an example, AWS™ provides many varying cloud services including searching/analytics (e.g., CloudSearch™), virtual servers (e.g., EC2™), media services (e.g., MediaConvert™), database services (e.g., Aurora™), storage (e.g., S3™), and others.

Computing device 110 may be in communication with statistical analysis resource 130, as shown in FIG. 1. In some embodiments, computing device 110 may be in communication with statistical analysis resource 130 directly. Alternatively, or in addition, computing device 110 may be in communication with statistical analysis resource 130 over network 120. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Statistical analysis resource 130 may be a variety of computing devices, including a personal computer (e.g., a desktop or laptop), a server, a virtual machine (e.g., virtualized computer, container instance, etc.), or similar. In some embodiments, statistical analysis resource 130 may include one or more virtual machines or virtualized instances, which may be based on virtualization tools provided by Amazon Web Services™ (AWS™), Microsoft Azure™, IBM Cloud™, Google Cloud Platform™, Cisco Metapod™, Joyent™, vmWare™, or others.

In some embodiments, statistical analysis resource 130 may be integral to computing device 110, for example, an application stored in memory of computing device 110. In such embodiments, statistical analysis resource 130 may operate when the application is executed on computing device 110. In other embodiments, statistical analysis resource 130 may have its own dedicated hardware within computing device 110. In some embodiments, statistical analysis resource 130 may include a machine learning tool or library, for example, IBM Watson™, Apache Spark™, Scikit Learn™, TensorFlow™, Google Cloud AI™, etc.

System 100 may also comprise one or more security servers 140 in communication with network 120. Security server 140 may manage the various elements of system 100. In some embodiments, security server 140 implement security controls on one or more of the elements of system 100. For example, security server 140 may implement security policies or measures that prevent loading of a malicious library or instruct a computing device to not load a library identified as potentially malicious or execute a malicious script. Security server 140 may also manage security threats to the system and access to libraries.

Figure 2:
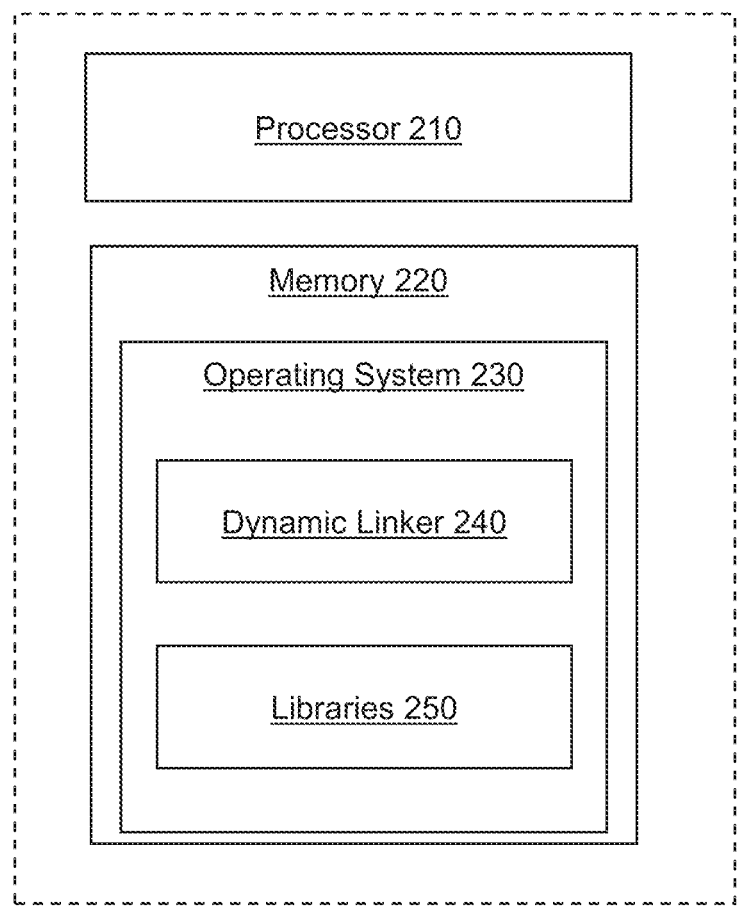
FIG. 2 is a block diagram showing an exemplary computing device in accordance with disclosed embodiments.

FIG. 2 is a block diagram showing an exemplary computing device 110 in accordance with disclosed embodiments. Computing device 110 may include one or more processors 210, one or more memories 220, an operating system 230, a dynamic linker 240, and one or more libraries 250. In some embodiments, statistical analysis resource 130 may have a structure similar to the exemplary structure of computing device 110 illustrated by FIG. 2 (e.g., one or more processors and one or more memories). Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any particular type of processor configured in the computing device 110.

Memory (or memories) 220 may include one or more storage devices configured to store instructions used by the processor 210 to perform functions related to the disclosed embodiments. Memory 220 may be configured to store software instructions, such as programs, that perform one or more operations when executed by the processor 210. The disclosed embodiments are not limited to particular software programs or devices configured to perform dedicated tasks. For example, the memory 220 may store a single program, such as a user-level application, or may comprise multiple software programs. Memory 220 may also include an operating system 230. As described above, operating system 230 may include a Windows™ operating system, Apple™ operating system, Android™ operating system, Linux operating system, a cloud-based operating system, or other types of operating systems. Additionally, the processor 210 may in some embodiments execute one or more programs (or portions thereof) remotely located from the computing device 120. Furthermore, the memory 220 may include one or more storage devices configured to store data for use by the programs.

Operating system 230 may include a dynamic linker 240. Dynamic linker 240 may load and link shared, or dynamically linked, libraries 250. For example, libraries 250 may be used by multiple applications running on computing device 110. When an application calls a library 250, dynamic linker 240 may load the library 250 and link or dynamically bind the library 250 to the running application. For example, if an application is linked to a Library A, when the application is executed dynamic linker 240 may identify that Library A needs to be loaded, locate library A, and then load Library A. Dynamic linker 240 may locate Library A by running a search path. A search path may describe the locations in which library A may be located and the order or hierarchy in which the locations should be searched. As described above, an exemplary Windows™ search path for Library A may first include the current working directory, then the \windows directory, then the \windows\system32 directory, then \windows\syswow64, and then the directory from which the application is loaded. Accordingly, dynamic linker 240 searching for Library A may first determine if Library A is located in the current directory. If it is not located in the current directory, it may move to the \windows directory. If Library A is not located in the \windows directory, the dynamic linker 240 may then search the \windows\system32 directory, and so on, until Library A is located or the search path ends. Assuming Library A is located somewhere within the search path, dynamic linker 240 can locate Library A and load it. At this time, both the application and the library may be run by the computing device 110. While in some embodiments dynamic linker 240 may be a standalone module, in other embodiments, dynamic linker 240 may be part of an application running on computing device 110.

Libraries 250 may be software modules containing sections of code, functions, data, etc. that may be used by one or more applications or other software modules. According to some embodiments, libraries 250 may be created such that multiple applications, modules, programming languages, etc. can call the same library. In some embodiments, libraries 250 may be executable. In other embodiments, libraries 250 may be non-executable or read-only, for example, to provide data. In other embodiments, libraries 250 may contain one or more sections. For example, a library may include one section that is executable containing one or more functions, and a second non-executable section containing data.

Figure 3:
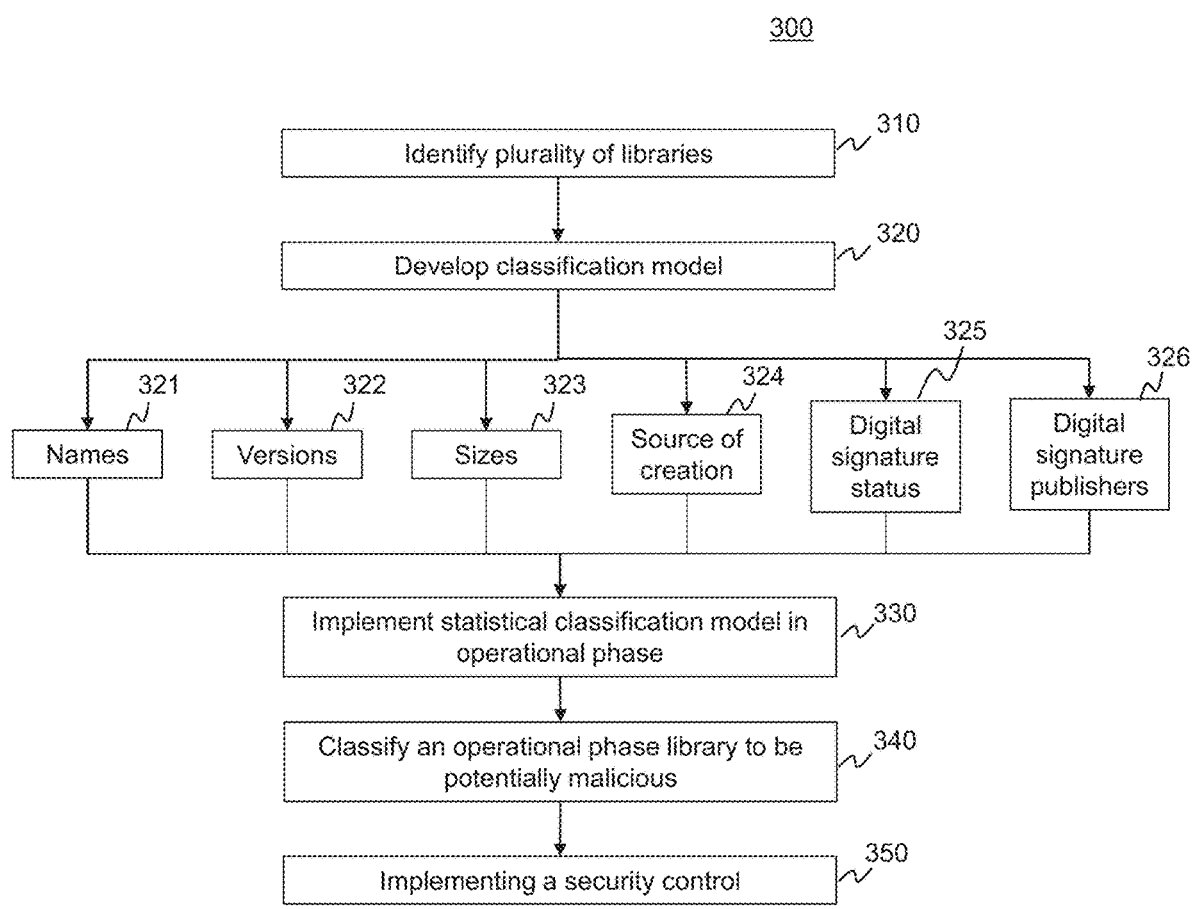
FIG. 3 is a flowchart depicting an exemplary process for statistically analyzing and classifying dynamically linked libraries in accordance with disclosed embodiments.

FIG. 3 is a flowchart depicting an exemplary process 300 for statistically analyzing and classifying dynamically linked libraries in accordance with disclosed embodiments. Process 300 may be performed by statistical analysis resource 130. In other embodiments, process 300 may be implemented by computing device 110 or security server 140. According to some embodiments, statistical analysis resource 130 may be part of computing device 110 and perform process 300. In other embodiments, process 300 may be performed by an application executed on computing device 110.

At step 310, process 300 may include identifying a plurality of libraries (e.g., libraries 250). For example, libraries 250 stored within computing device 110 may be identified in step 310. Libraries 250 may be associated with dynamic linker 240, which in turn may be associated with operating system 230. In some embodiments, a subset of all of the libraries stored on computing device 110 or associated with dynamic linker 240 may be identified. In other embodiments, statistical analysis resource 130 or computing device 110 may perform process 300 to analyze libraries associated with or stored in a virtual (cloud) computing environment. In some embodiments, step 310 may identify libraries associated with the computing device 110, but stored on the cloud or otherwise remote from computing device 110. In such cases, the remote libraries may be used in a training phase, while libraries analyzed in an operational phase are stored locally on computing device 110. The training phase and operational phase are described in greater detail below. In other embodiments, remote libraries may be used in both phases. Likewise, both phases may be implemented using only libraries local to computing device 110 or a combination of local and remote libraries.

At step 320, process 300 may include developing a classification model. The classification model may be used to classify a library as malicious or non-malicious. A malicious library may be one that was placed in a directory by an attacker and/or contains malicious code. The classification model may be a statistical classification model that uses statistical modeling to analyze a library and classify it as potentially malicious or non-malicious. The classification model may be implemented in two phases: a training phase and an operational phase. During the training phase, the classification model may be developed. During the operational phase, the classification model may be implemented to classify various libraries of unknown maliciousness. As described in greater detail below, the classification model may make the classification by estimating the likelihood (or, e.g., developing a score or confidence level) that the unknown library is malicious.

The classification model may be a machine learning model. For example, the classification model may be a supervised machine learning model that is trained using pre-classified libraries. The training phase of the classification model may develop and train the model to classify libraries as either malicious or non-malicious. The training phase may comprise feeding a set of training data to the model. The training data may be a set of libraries that are pre-classified (e.g., manually) as malicious or non-malicious. Each of the libraries may have several parameters associated with it that may be used, alone or in combination, to determine if a library is a legitimate real library or a phony library created by a malicious actor. Each of these factors may be used by the classification model in the training phase to learn if a certain factor or combination of factors makes it more or less likely for a library to be malicious.

One parameter may be the number of libraries sharing a common name 321. For example, the classification model may determine that if more than one library has a particular name (or closely similar name), that one of libraries is likely to be malicious. Similarly, a number of libraries having a particular version 322 may indicate that one of the libraries is likely to be malicious. Likewise, the number of libraries having a particular size 323 (e.g., file size) is another parameter that may be monitored. The classification model may also determine the source of creation 324 (e.g., identity, account name, IP address, etc.) of the library. For example, if the library was installed by the application that loads the library, the library may be less likely to be malicious. However, if the library was installed by an unrecognized user or application, the library may be more likely to be malicious.

The classification model may also determine the digital signature status 325 of the library and the number of digital signature publishers 326 associated with the digital signature status of the library. For example, the classification model may analyze the library to determine if the library was digitally signed with a certificate of a trusted authority (e.g., Verisign™, Digicert™, etc.). The number of digital signature authorities or publishers may also be taken into account by the classification model. In other words, the classification model may determine whether digital signatures of signed libraries of the same name were published by the same entity. For example, if the signatures are associated with different publishers, it may be more likely that one of the libraries is malicious.

It is to be understood that the classification model is not limited to considering only parameters 321-326; additional or alternative parameters may be used. Further, in some embodiments parameters 321-326 may be expressed in approved or non-approved lists (e.g., whitelists or blacklists). If a particular parameter (e.g., version 322) is included in a whitelist, it may not be considered to be malicious with respect to its version. But if the version 322 is on blacklist, or simply not on the whitelist, that may be an indication that the corresponding library is potentially malicious.

Figure 4:
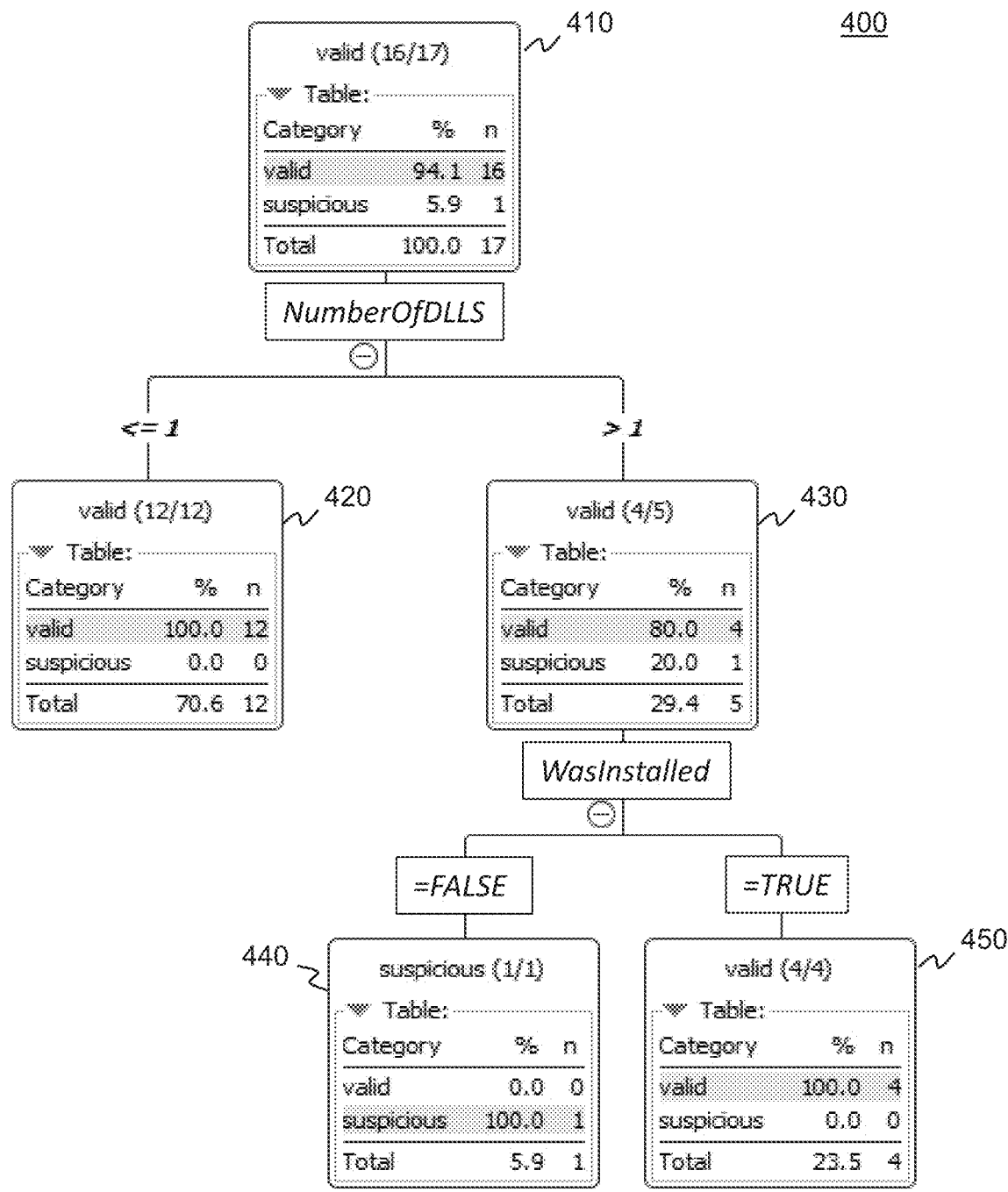
FIG. 4 is an illustration depicting an exemplary statistical classification model for classifying dynamic linked libraries in accordance with disclosed embodiments.

Taking one or more of these parameters into account, the classification model may analyze each of pre-classified libraries contained in the training data set. Based on this analysis, the statistical classification model may be developed that may be able to determine the likelihood of a given library being malicious. The statistical classification model may take various forms. FIG. 4 is an illustration depicting an exemplary statistical classification model 400 for classifying dynamic linked libraries in accordance with disclosed embodiments. FIG. 4 specifically shows an exemplary decision tree created using training data from seventeen libraries, using two of the parameters described above. At the first node 410, the tree indicates that sixteen of the seventeen libraries are known to be valid and one is suspicious (potentially malicious). The first decision in the decision tree determines whether there is more than one library stored on the file system with the same name. As shown in the example, the training data produced five libraries 410-450 that share a name with another library. The next branch of the tree determines if the library was installed by an application that loads or uses the library. In this example, the four libraries 410, 420, 430, 450 that were installed by their corresponding applications were valid libraries. The one suspicious library 440, however, was not installed by its corresponding application and was therefore isolated in the decision tree.

Accordingly, the classification model developed in step 320 of FIG. 3 may take forms similar to the exemplary simplified decision tree in FIG. 4. While the decision tree of FIG. 4 depicts only two parameters being used to classify libraries, it is understood that additional or fewer parameters may be used in the classification model. In some embodiments, the classification model may use other parameters in addition to or in alternative to parameters 321-326 described above. According to some embodiments, the training phase may include developing multiple models using different combinations of parameters 321-326. The model may then choose the one or more most accurate models or parameters 321-326 to be implemented in the operational phase described below. Furthermore, decisions may be made based on the values of certain parameters (e.g., a number of libraries having a common name or version, creation source, specific library size, etc.). In some embodiments, the thresholds for these parameter values used to determine the likelihood of maliciousness may be predefined and stored on computing device 110 or statistical analysis resource 130. In other embodiments, the threshold values may change over time or be updated by the computing device 110, statistical analysis resource 130, or security server 140. Moreover, while FIG. 4 depicts a decision tree classifier, as described above, other types of classification models are possible. The classifier may also be one of various other types of statistical or machine learning models, for example, a linear regression model, random forests classifier, neural network model, logistic regression model, etc.

Referring back to FIG. 3, at step 330, process 300 may include implementing the statistical classification model in an operational phase. The operational phase may phase be distinct from the training phase. In other embodiments, the operational phase and training phase may be implemented at the same time, or the model may alternate between the operational phase and training phase. In other words, in some embodiments, the classification model may be trained once and not trained again. However, in other embodiments, the classification model may be refined over time through additional (e.g., iterative, feedback-based, or continuous) training.

In the operational phase, the classification model may receive a library input, analyze one or more the parameters 321-326 of the library, and classify the library as malicious or non-malicious based on the analyzed parameters. The operational phase library input may be different from the libraries identified in step 310. However, the operational phase library to be classified may be stored in memory 220 and/or associated with the dynamic linker 240 and operating system 230. The operational phase may be implemented such that the classification model is fed with libraries in real time to determine if libraries are potentially malicious before being loaded.

At step 340, process 300 may include classifying an operational phase library as potentially malicious. As described above, in the operational phase, the classification model can be fed with libraries to be classified as potentially malicious or non-malicious (e.g., real, legitimate, benign, etc.). Based upon the analyzed statistics of the training data received in the training phase, the classification model may be able to determine the likelihood that a particular library is malicious through analysis of one or more of parameters 321-326. For example, if the classification model is a decision tree (e.g., as shown in FIG. 4), the model may work through various nodes of the decision tree until a determination of non-maliciousness or potential maliciousness is made by reaching a termination point.

The likelihood that a particular library is malicious may be determined using a percentage or the odds that the library is malicious. In other embodiments, the classification model may generate a score or confidence level that represents the likelihood that a library is malicious. In some embodiments, the classification model may compare the likelihood percentage or score to a threshold. The classification model may generate the threshold value, or in other embodiments, the threshold value may be predefined or generated by statistical analysis resource 130 or security server 140. For example, if the score or percentage indicating the likelihood that a library is malicious exceeds the threshold, the model may classify the library as potentially malicious or actually malicious.

If a library in the operational phase is determined to be potentially malicious, at step 350, process 300 may include implementing a security control action. Implementing a security control action may comprise sending an alert or security report to a security application, computing device 110, or security server 140. The alert or security report may identify the potentially malicious library (e.g., by name, by computing resource 110, by parameters 321-326, etc.). In such embodiments, the security application, computing device 110, or security server 140 may implement further one or more of the security controls described in greater detail below. In other embodiments, statistical analysis resource 130 may implement one or more security controls. In some embodiments, security controls may be implemented by the security application itself. The security application may, for example, be executed by computing device 110. In other embodiments, security application may be executed by security server 140.

In some embodiments, the security control in step 350 may comprise blocking access to or preventing loading of a library determined to be malicious or potentially malicious. Such blocking of access may prevent a malicious library from being loaded and then executing (or facilitating) an attack on the system of computing device 110. According to some embodiments, the security control may comprise auditing the operation of a potentially malicious library (e.g., recording its actions, recording identities involved in the execution, etc.). In some cases, it may be determined that auditing operation of a library is more appropriate than blocking access altogether. One such situation may occur when the classification model finds a library to be potentially malicious, but the library has a relatively lower likelihood or confidence of being malicious compared to other libraries (e.g., the likelihood percentage or score exceeds the threshold level of maliciousness, but only slightly). In some embodiments, the control application may remove the potentially malicious library from the system, or notify the computing device 110 that the library should be removed.

In some embodiments, the classification model may classify a library in the operational phase as non-malicious or benign. Such a library may be a legitimate library installed and used by the system or an application, and as such, present no threat to the system. When the classification model classifies a library as benign, a security control related to the library may not be implemented because the library may not present a security threat. Various other types of security controls are possible as well (e.g., pausing or freezing operation of computing device 110 or an application seeking to access the library, prompting a separate security application to begin execution, disabling or lowering an account membership of the computing device or application seeking access to the identity, revoking or disabling privileges, etc.

Figure 5:
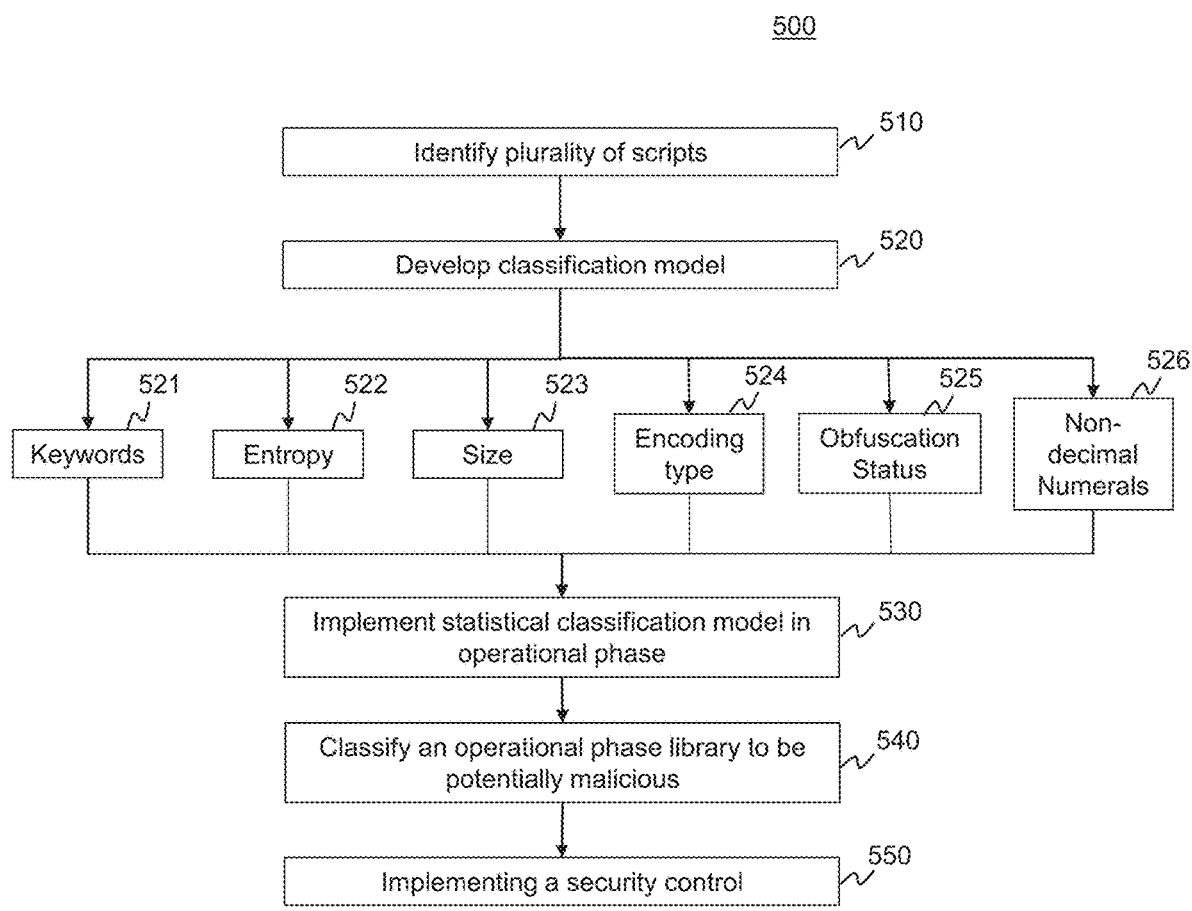
FIG. 5 is a flowchart depicting an exemplary process for statistically analyzing and classifying computing scripts in accordance with disclosed embodiments.

FIG. 5 is a flowchart depicting an exemplary process 500 for statistically analyzing and classifying computing scripts in accordance with disclosed embodiments. Process 500 is a similar process to process 300, but for analyzing computing scripts rather than libraries. Accordingly, parts of process 500 may correspond to parts of process 300, thus the above descriptions of the components and steps of process 300 may apply to process 500 as well.

Process 500 may be performed by statistical analysis resource 130. In other embodiments, process 500 may be implemented by computing device 110 or security server 140. According to some embodiments, statistical analysis resource 130 may be part of computing device 110 and perform process 500. In other embodiments, process 500 may be performed by an application executed on computing device 110.

At step 510, process 500 may include identifying a plurality of computing scripts. For example, computing scripts associated with computing device 110 may be identified. Computing scripts may also be associated with one or more applications stored or executed on computing device 110. In some embodiments, computing scripts may be associated with a virtual or cloud computing environment, or one or more virtual instances running on the cloud computing environment. In some embodiments, a computing device 110 or computing environment may contain a large number of scripts, some of which may originate internal to the computing device or environment, and some of which may originate externally (e.g., from Github™ or other third-party sources). Accordingly, only a subset of all of the scripts may be identified at step 510, in some cases. In further embodiments, step 510 may identify scripts stored on the cloud or remote from computing device 110. In such cases, the remote scripts may be used in a training phase, while scripts analyzed in an operational phase are stored locally on or otherwise associated with computing device 110. The training phase and operational phase are described in greater detail below. In other embodiments, remote libraries may be used in both phases. Likewise, both phases may be implemented using only libraries local to computing device 110 or a combination of local and remote libraries.

At step 520, process 500 may include developing a classification model. The classification model may be used to classify a script as malicious or non-malicious. A malicious script may be one that was created by an attacker and contains malicious code. The classification model may be a statistical classification model that uses statistical modeling to analyze a script and classify it as potentially malicious or non-malicious. The classification model may be implemented in two phases: a training phase and an operational phase. During the training phase, the classification model may be developed. During the operational phase, the classification model may be implemented to classify various scripts of unknown maliciousness. As described in greater detail below, the classification model may make the classification by estimating the likelihood that the unknown script is malicious.

The classification model may be a machine learning model. For example, the classification model may be a supervised machine learning model that is trained using pre-classified scripts. The training phase of the classification model may develop and train the model to classify scripts as either malicious or non-malicious. The training phase may comprise feeding a set of training data to the model. The training data may be a set of scripts that are pre-classified as malicious or non-malicious. Each of the scripts may have several parameters associated with it that may be used, alone or in combination, to determine if a script is a legitimate real script or rather a phony script created by a malicious actor. Each of these factors may be used by the classification model in the training phase to learn if a certain factor or combination of factors makes it more or less likely for a script to be malicious.

One parameter may be whether the script contains certain keywords 521. For example, the presence of some words contained within a script may make it more likely that the script is malicious. Keywords may include known malicious words, unknown words, incorrectly spelled or syntaxed words, etc. The classification model may also check the entropy of the script 522. The entropy of the script 522 may describe a measure of randomness of the script. For example, a script with a high level of entropy may be more likely to be malicious than a script with a low level of entropy.

Another parameter that may be evaluated by the classification model is the size 523 of the script. For example, scripts above a certain size 523 may be more likely to be malicious than smaller scripts. Similarly, the classification model may also determine the encoding type 524 of a script. Certain encoding types 524 may be more frequently used for malicious scripts than for legitimate or benign scripts. The obfuscation status 525 of a script may also indicate that a script is more or less likely to be malicious. For example, a highly obfuscated script may be more likely to be malicious than a script that is not obfuscated. An obfuscation status may identify whether a script has been converted from a first version into an obfuscated version. Another parameter that the classification model may take into account is the presence of non-decimal numerals 526 (e.g., hexadecimal values) in the script. As an example, the presence of hexadecimal values in a script may make the script more likely to be malicious. It is to be understood that while FIG. 5 illustrates six parameters 521-526, the classification model is not limited to considering only parameters 521-526; additional or alternative parameters may be used. Further, parameters 521-526 may be expressed in allowed or blocked lists (e.g., whitelists or blacklists), as discussed above in connection with FIG. 3.

Figure 6:
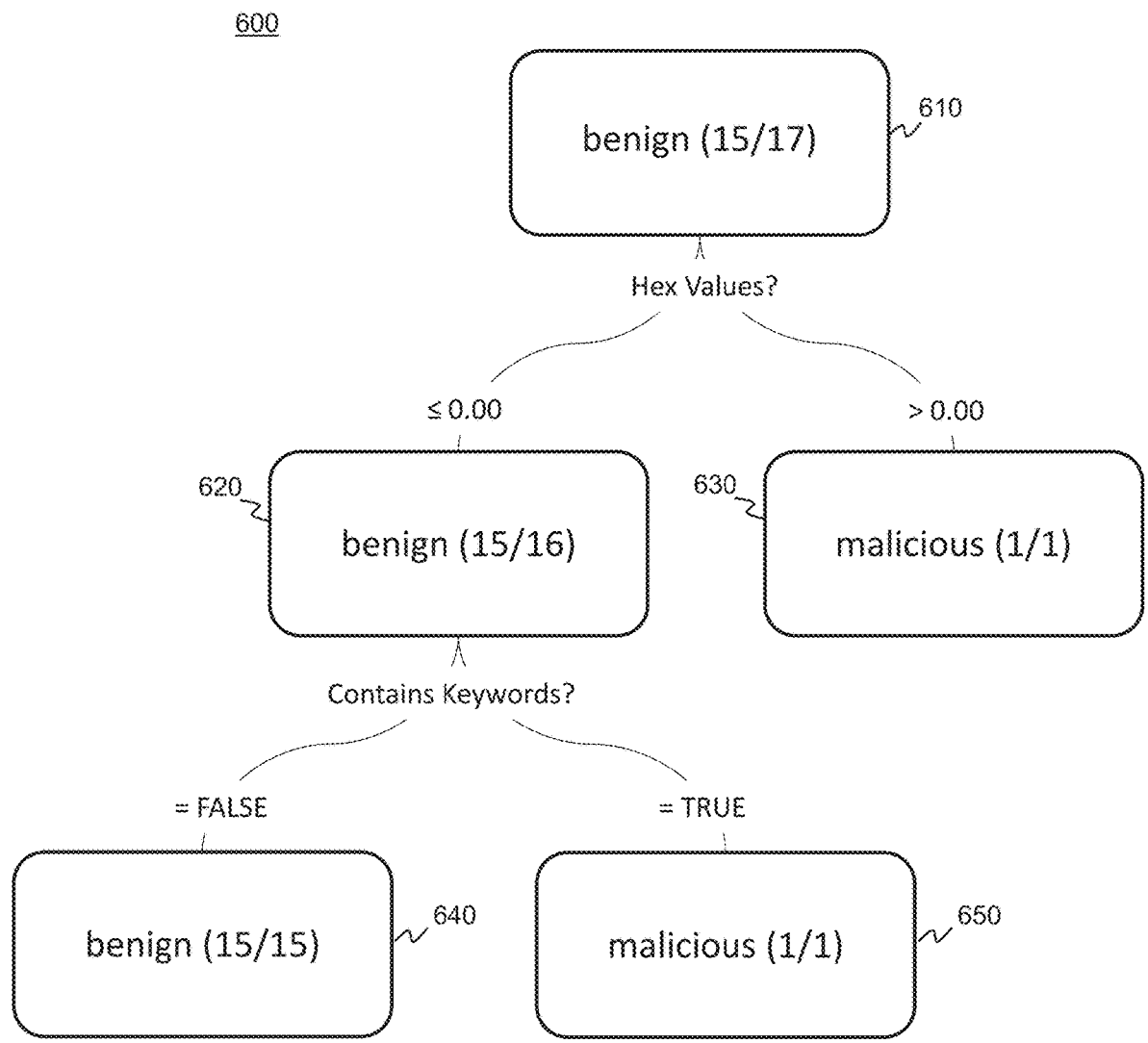
FIG. 6 is an illustration depicting an exemplary statistical classification model for classifying scripts in accordance with disclosed embodiments.

Taking one or more of these parameters into account, the classification model may analyze each of pre-classified scripts contained in the training data set. Based on this analysis, the statistical classification model may be developed that may be able to determine the likelihood of a given script being malicious. The statistical classification model may take various forms. FIG. 6 is an illustration depicting an exemplary statistical classification model 600 for classifying scripts in accordance with disclosed embodiments. FIG. 6 specifically shows an exemplary decision tree created using training data from seventeen scripts, using two of the parameters described above, non-decimal values 526 and keywords 521. At the first node 610, the tree indicates that fifteen of the seventeen scripts are known to be benign (non-malicious) and two are potentially malicious. The first decision in the decision tree determines whether a script contains non-decimal values (e.g., hexadecimal values). As shown in the example, the training data produced one script containing hexadecimal values. The next branch of the tree determines if the script contains one or more keywords. In this example, the fifteen of the scripts did not contain keywords (as shown in node 620) and were valid scripts. The one remaining suspicious script, however, contained one or more keywords (as shown in node 630) and was therefore isolated in the decision tree.

Accordingly, the classification model developed in step 520 of FIG. 5 may take forms similar to the exemplary simplified decision tree in FIG. 6. While the decision tree of FIG. 6 depicts only two parameters being used to classify scripts, it is understood that additional or fewer parameters may be used in the classification model. In some embodiments, the classification model may use other parameters in addition to or in alternative to parameters 521-526 described above. According to some embodiments, the training phase may include developing multiple models using different combinations of parameters 521-526. The model may then choose the one or more most accurate models or parameters 521-526 to be implemented in the operational phase described below. Furthermore, decisions may be made based on the values of certain parameters (e.g., a specific script size, certain keywords, a level of script entropy, etc.). In some embodiments, the thresholds for these parameter values may be predefined and stored on computing device 110 or statistical analysis resource 130. In other embodiments, the threshold values may change over time or be updated by the computing device 110, statistical analysis resource 130 or security server 140. Moreover, while FIG. 6 depicts a decision tree classifier, as described above, other types of classification models are possible. The classifier may also be one of various other types of statistical or machine learning models, for example, a linear regression model, random forests classifier, neural network model, logistic regression model, etc.

Referring back to FIG. 5, at step 530 process 500 may include implementing the statistical classification model in an operational phase. The operational phase may phase be distinct from the training phase. In other embodiments, the operational phase and training phase may be implemented at the same time, or the model may alternate between the operational phase and training phase. In other words, in some embodiments, the classification model may be trained once and not trained again. However, in other embodiments, the classification model may be refined over time through additional (e.g., continuous or feedback-based) training.

In the operational phase, the classification model may receive a script input, analyze one or more the parameters 521-526 of the script, and classify the script as malicious or non-malicious based on the analyzed parameters. The operational phase script input may be different from the scripts identified at step 510. However, the operational phase script to be classified may be associated with computing device 110, The operational phase may be implemented such that the classification model is fed with scripts in real time to determine if the scripts are potentially malicious before they are executed.

At step 540, process 500 may include classifying an operational computing script as potentially malicious. As described above, in the operational phase, the classification model can be fed with scripts to be classified as potentially malicious or non-malicious (e.g., real, legitimate, benign, etc.). Based upon the analyzed statistics of the training data received in the training phase, the classification model may be able to determine the likelihood that a particular script is malicious through analysis of one or more of parameters 521-526. For example, if the classification model is a decision tree, the model may work through various nodes of the decision tree until a determination of non-maliciousness or potential maliciousness is made by reaching a termination point.

The likelihood or confidence level that a particular script is malicious may be determined using a percentage or the odds that the script is malicious. In other embodiments, the classification model may generate a score or confidence that represents the likelihood that a script is malicious. In some embodiments, the classification model may compare the likelihood percentage or score to a threshold. In some embodiments, the classification model may generate the threshold value. In other embodiments, the threshold value may be predefined or determined by statistical analysis resource 130 or security server 140. For example, if the score or percentage indicating the likelihood that a script is malicious exceeds the threshold, the model may classify the script as potentially malicious or malicious.

If a script in the operational phase is determined to be potentially malicious, at step 550 process 500 may include implementing a security control action. Implementing a security control action may comprise sending an alert or security report to a security application, computing device 110, or security server 140. The alert or security report may identify the potentially malicious script. In such embodiments, the security application, computing device 110 or security server 140 may implement further one or more of the security controls described in greater detail below. In other embodiments, statistical analysis resource may implement one or more security controls. In some embodiments, security controls may be implemented by the security application. The security application may, for example, be executed by computing device 110. In other embodiments, security application may be executed by security server 140. In some embodiments, the control application may remove the potentially malicious library from the system, or notify the computing device that the library should be removed.

In some embodiments, the security control may comprise blocking access to or preventing execution of a script determined to be malicious or potentially malicious. Such blocking of access may prevent a malicious script from executing an attack on the system. According to some embodiments, the security control may comprise auditing operation of the potentially malicious script. In some cases, it may be determined that auditing operation of a script is more appropriate than blocking access altogether. One such situation may occur when the classification model finds a script to be potentially malicious, but the script has a relatively lower likelihood of being malicious compared to other scripts (e.g., the likelihood percentage or score exceeds the threshold level of maliciousness only slightly).

In some embodiments, the classification model may classify a script in the operational phase as non-malicious or benign. Such a script may be a legitimate script used by the system or an application, and as such, presents no threat. When the classification model classifies a script as benign, a security control related to the script may not be implemented because the script may not present a security threat. Various other types of security controls are possible as well.

A potential use case of the disclosed embodiments is described below. It is understood that this use case is provided by way of example only and is not limiting of the present disclosure.

One potential implementation may be to detect and address a malicious dynamically linked library (DLL) stored on a computing device 110, for example, a personal computer using a Windows™ operating system 230. A malicious attacker may gain access to a directory of the computing device 110. Knowing the dynamic link library search path for a specific application, for example, Microsoft Word™, the attacker may know that the application searches the directory from which the application is loaded before searching other directories. Thus, the attacker may place a false library in the same directory as the Word™ application. The false library may have the same name and version number as a legitimate library used by Word™. Thus, when the user loads the Word™ application, the dynamic linker 240 may also load the malicious library, making the system vulnerable to attack.

However, using the disclosed embodiments, the user's system may detect the false library and block access to it (or take another security control action). The user's personal computer 110 may be networked via network 120 to a statistical analysis resource 130 that may develop a statistical classification model that can determine if a library is potentially malicious. The model may be trained using a training data set of hundreds of libraries that have been pre-classified as either malicious or non-malicious. Using the pre-classified training data, the classification model may be developed to determine based on the statistics of the training data, whether a new library is likely to be malicious.

In this exemplary case, the attacker's false library may be fed into the classification model. The classification model may determine that the library is likely to be malicious because there are multiple libraries with the same name in the file system and the multiple libraries have the same version number. Further the fact that the attacker's library was not installed by Word™ (the application that loads it) may also indicate to the classification model that the attacker's library is likely to be malicious. Accordingly, the classification model may classify the attacker's library as potentially malicious. As a result of this classification, the statistical analysis resource 130 may send a notification to the personal computer 110, or a security server 140 associated with the computer 110, identifying the attacker's library as potentially malicious. Then, the personal computer 110 or security server 140 could enact security controls (e.g., as described in connection with FIGS. 3 and 5, in steps 350 and 550) to prevent the loading of the attacker's library, thus thwarting the attempted attack. Thus, by using the disclosed embodiments to develop and implement a statistical classification model, vulnerabilities in computing systems from a dynamic linker may be detected and protected against.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for statistically analyzing and classifying dynamically linked libraries, the operations comprising:
    identifying a plurality of libraries associated with a dynamic linker, the dynamic linker being associated with an operating system;
    developing a statistical classification model for the dynamic linker, the statistical classification model being developed through a training phase based on one or more parameters, the one or more parameters comprising at least one of:
        a number of the plurality of libraries having a common name,
        a number of the plurality of libraries having a particular version,
        a number of the plurality of libraries having a particular size,
        a source of creation for one or more of the plurality of libraries,
        a digital signature status for one or more of the plurality of libraries, or
        a number of digital signature publishers associated with a digital signature status for one or more of the plurality of libraries;
    implementing the statistical classification model for the dynamic linker in an operational phase to determine, based on the one or more parameters, if one or more of the libraries is potentially malicious;
    classifying, based on the implementing, an operational phase library to be potentially malicious by the statistical classification model; and
    implementing, for the classified operational phase library, a security control action.

2. The non-transitory computer readable medium of claim 1, wherein the security control action includes blocking access to the operational phase library.

3. The non-transitory computer readable medium of claim 1, wherein the security control action includes auditing operation of the operational phase library.

4. The non-transitory computer readable medium of claim 1, wherein the security control action includes sending a prompt to a security application identifying the classified operational phase library.

5. A computer-implemented method for statistically analyzing and classifying dynamically linked libraries, the method comprising:
    identifying a plurality of libraries associated with a dynamic linker, the dynamic linker being associated with an operating system;
    developing, by a statistical analysis resource, a statistical classification model for the dynamic linker, the statistical classification model being developed through a training phase based on one or more parameters, the one or more parameters comprising at least one of:
        a number of the plurality of libraries having a common name,
        a number of the plurality of libraries having a particular version,
        a number of the plurality of libraries having a particular size,
        a source of creation for one or more of the plurality of libraries,
        a digital signature status for one or more of the plurality of libraries, or
        a number of digital signature publishers associated with a digital signature status for one or more of the plurality of libraries;
    implementing the statistical classification model for the dynamic linker in an operational phase to determine, based on the one or more parameters, if one or more of the libraries is potentially malicious;
    classifying, based on the implementing, an operational phase library to be potentially malicious by the statistical classification model; and
    implementing, for the classified operational phase library, a security control action.

6. The computer-implemented method of claim 5, wherein the operational phase library is assigned a probability of being potentially malicious.

7. The computer-implemented method of claim 6, wherein the operational phase library is determined to be potentially malicious if the probability exceeds a threshold.

8. The computer-implemented method of claim 5, wherein the operations further comprise detecting, based on the implementing, a second operational phase library that is classified to be benign by the statistical classification model.

9. The computer-implemented method of claim 8, wherein the operations further comprise not implementing the security control action for the second operational phase library.

10. The computer-implemented method of claim 5, wherein the statistical classification model is a decision tree classifier model.

11. A non-transitory computer readable medium including instructions that, when executed by at least one processor, cause the at least one processor to perform operations for statistically analyzing and classifying computing scripts, the operations comprising:
    identifying a plurality of computing scripts;
    developing a statistical classification model for the plurality of computing scripts, the statistical classification model being developed through a training phase based on one or more parameters, the one or more parameters comprising at least one of:
        an obfuscation status for the plurality of computing scripts,
        an entropy for the plurality of computing scripts,
        a size of the plurality of computing scripts,
        an encoding type for the plurality of computing scripts, a presence of keywords in the plurality of computing scripts, or a presence of non-decimal numerals in the plurality of computing scripts;

implementing the statistical classification model for the plurality of computing scripts in an operational phase to determine, based on the one or more parameters, if one or more of the computing scripts is potentially malicious;

classifying, based on the implementing, an operational computing script to be potentially malicious by the statistical classification model; and implementing, for the classified operational computing script, a security control action.

12. The non-transitory computer readable medium of claim 11, wherein the plurality of computing scripts are associated with a common virtual computing platform.

13. The non-transitory computer readable medium of claim 11, wherein the plurality of computing scripts are associated with a particular computing resource.

14. The non-transitory computer readable medium of claim 11, wherein the non-decimal numerals include a hexadecimal numeral.

15. The non-transitory computer readable medium of claim 11, wherein the obfuscation status identifies whether the plurality of scripts have been transformed from a first version to an obfuscated version.

16. A computer-implemented method for statistically analyzing and classifying computing scripts, the method comprising:

identifying a plurality of computing scripts;

developing, by a statistical analysis resource, a statistical classification model for the plurality of computing scripts, the statistical classification model being developed through a training phase based on one or more parameters, the one or more parameters comprising at least one of:

an obfuscation status for the plurality of computing scripts, an entropy for the plurality of computing scripts, a size of the plurality of computing scripts, an encoding type for the plurality of computing scripts, a presence of keywords in the plurality of computing scripts, or a presence of non-decimal numerals in the plurality of computing scripts;

implementing the statistical classification model for the plurality of computing scripts in an operational phase to determine, based on the one or more parameters, if one or more of the computing scripts is potentially malicious;

classifying, based on the implementing, an operational computing script to be potentially malicious by the statistical classification model; and implementing, for the classified operational computing script, a security control action.

17. The computer-implemented method of claim 16, further comprising detecting, based on the implementing, a second operational computing script that is classified to be benign by the statistical classification model.

18. The computer-implemented method of claim 17, wherein the operations further comprise not implementing the security control action for the second operational computing script.

19. The computer-implemented method of claim 16, wherein the security control action includes blocking access to the operational computing script.

20. The computer-implemented method of claim 16, wherein the security control action includes auditing operation of the operational computing script.

* * * * *